United States Patent

[11] 3,557,304

| [72] | Inventors | Richard O. Rue; Floyd A. Kinder; Vance L. Hansen, China Lake, Calif. |
|---|---|---|
| [21] | Appl. No. | 677,789 |
| [22] | Filed | Oct. 24, 1967 |
| [45] | Patented | Jan. 19, 1971 |
| [73] | Assignee | the United States of America as represented by the Secretary of the Navy |

[54] REMOTE CONTROL FLYING SYSTEM
1 Claim, 3 Drawing Figs.

[52] U.S. Cl. ................................................. 178/6.8, 178/7.85
[51] Int. Cl. ..................................................... H04n 5/72, H04n 7/18
[50] Field of Search ........................................... 178/6IND, 7.85, 6.8; 350/125; 244/138, 138.1, 141

[56] References Cited

UNITED STATES PATENTS

| 2,515,254 | 7/1950 | Nosker | 178/6IND |
| 3,469,026 | 9/1969 | Winik | 178/6IND |
| 3,469,260 | 9/1969 | Holt | 178/6IND |
| 2,825,260 | 3/1958 | O'Brien | 178/7.85 |
| 3,181,809 | 5/1965 | Lobelle | 244/138 |
| 3,209,073 | 9/1965 | Falbel | 178/7.85 |
| 3,288,927 | 11/1966 | Plump | 178/7.5D |
| 3,311,017 | 3/1967 | Eckholm | 350/125 |

OTHER REFERENCES

Television News, March— April 1931 " The Radio-Controlled Television Plane" pages 10, 11, 75, 76. Copy in 178/6 IND Primary Examiner—Robert L. Griffin
Assistant Examiner—Howard W. Britton
Attorneys—George J. Rubens, Roy Miller and Victor C. Muller ABSTRACT: A system for flying a drone aircraft by remote control comprising a television camera mounted in the cockpit of the drone aircraft where the pilot's head is normally located; a wide-angle lens mounted on the television camera; transmitting means to send the pictures back to the ground where they are projected using rear projection means onto a hemispherical viewing screen; and a remote ground control for flying the drone in response to the pictures received from the cockpit television camera.

PATENTED JAN 19 1971

Richard O. Rue
Floyd A. Kinder
Vance L. Hansen
INVENTORS

BY
Roy Miller
ATTORNEY

Richard O. Rue
Floyd A. Kinder
Vance L. Hansen
INVENTORS

BY

Roy Miller
ATTORNEY

REMOTE CONTROL FLYING SYSTEM

BACKGROUND OF THE INVENTION

Present systems used for control of drone aircraft depend upon close visual watch of the aircraft from the ground and from chase planes which follow the drone in flight. An array of on-off function switches with a two-way telemetry link give a display of the drone instruments to a ground controller. The ground controller while visually observing the drone, uses a set or remote drone controls to cause the plane to take off. As soon as the drone leaves the ground, a chase plane pilot in close visual contact with the drone takes over control, flying both his chase plane and the drone; a second faster chase plane takes over control when necessary. On landing, the procedure is reversed.

Since no attempt is made to provide simulation of actual cockpit controls, time is wasted familiarizing ground controllers and pilots with the control system. A controller, either on the ground or piloting a chase plane, is handicapped by the unnaturalness of the control system, and by the lack of capability for assessing the yaw, pitch and roll of the drone. In an emergency situation, possible loss of control could be averted if there was simulation of cockpit control.

It is therefore desirable to provide a realistic 180° view from from the cockpit of a drone to simulate cockpit flying.

When an ultrawide-angle lens is mounted on a movie camera and the resulting picture presented on a flat surface, extreme barrel distortion occurs. It is well known that this barrel distortion can be corrected by projecting the image onto a section of a sphere or a hemisphere to achieve a full 180° undistorted view. See Popular Science, Volume 155, July, 1949, pages 92 and 93.

SUMMARY

The general purpose of this invention is to provide a ground controller with a 180° field of view from the cockpit of a drone aircraft to permit flying of the drone under simulated cockpit conditions.

Accordingly, a television camera equipped with a lens having a 180° field of view is mounted in the cockpit of a drone aircraft where the pilot's head is normally located and rigidly attached to the cockpit seat frame. The signals from the television camera are received by a television projector which projects the view from the cockpit onto the convex surface of a transluscent hemisphere. A ground controller observing the projection from the center of curvature of the hemisphere is presented with an undistorted view from the drone.

A simulated cockpit with controls identical to the drone to be flown is constructed adjacent to the transluscent hemisphere. Thus, the ground controller can view the hemisphere and operate the drone controls to simulate cockpit flying.

DESCRIPTION OF THE PREFERRED EMBODIMENT

Figure 1:
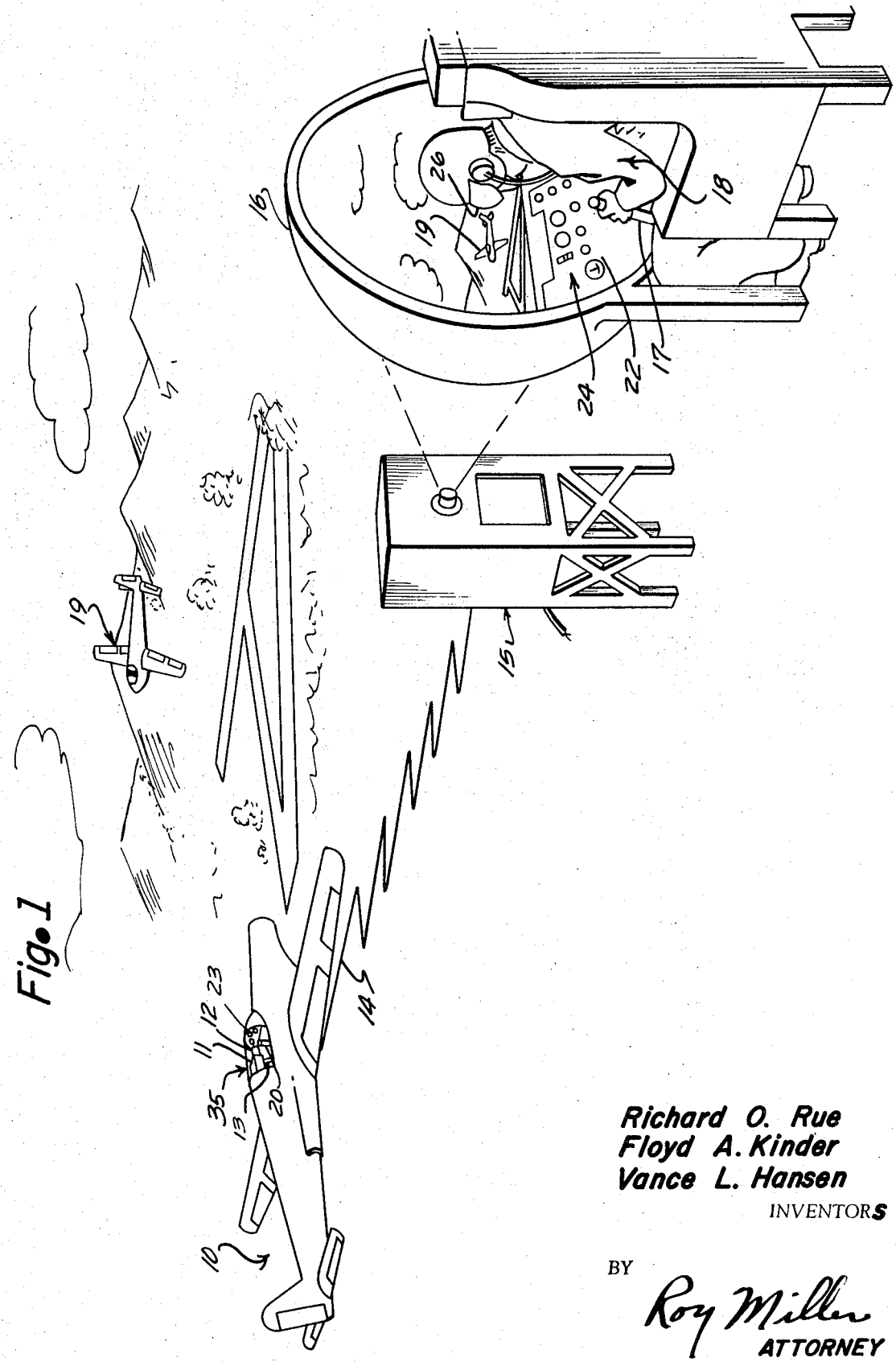
FIG. 1 illustrates a drone aircraft with a television camera mounted therein flying over terrain; and the ground controller sitting in his simulated cockpit with the view of said terrain displayed before him.
Figure 2:
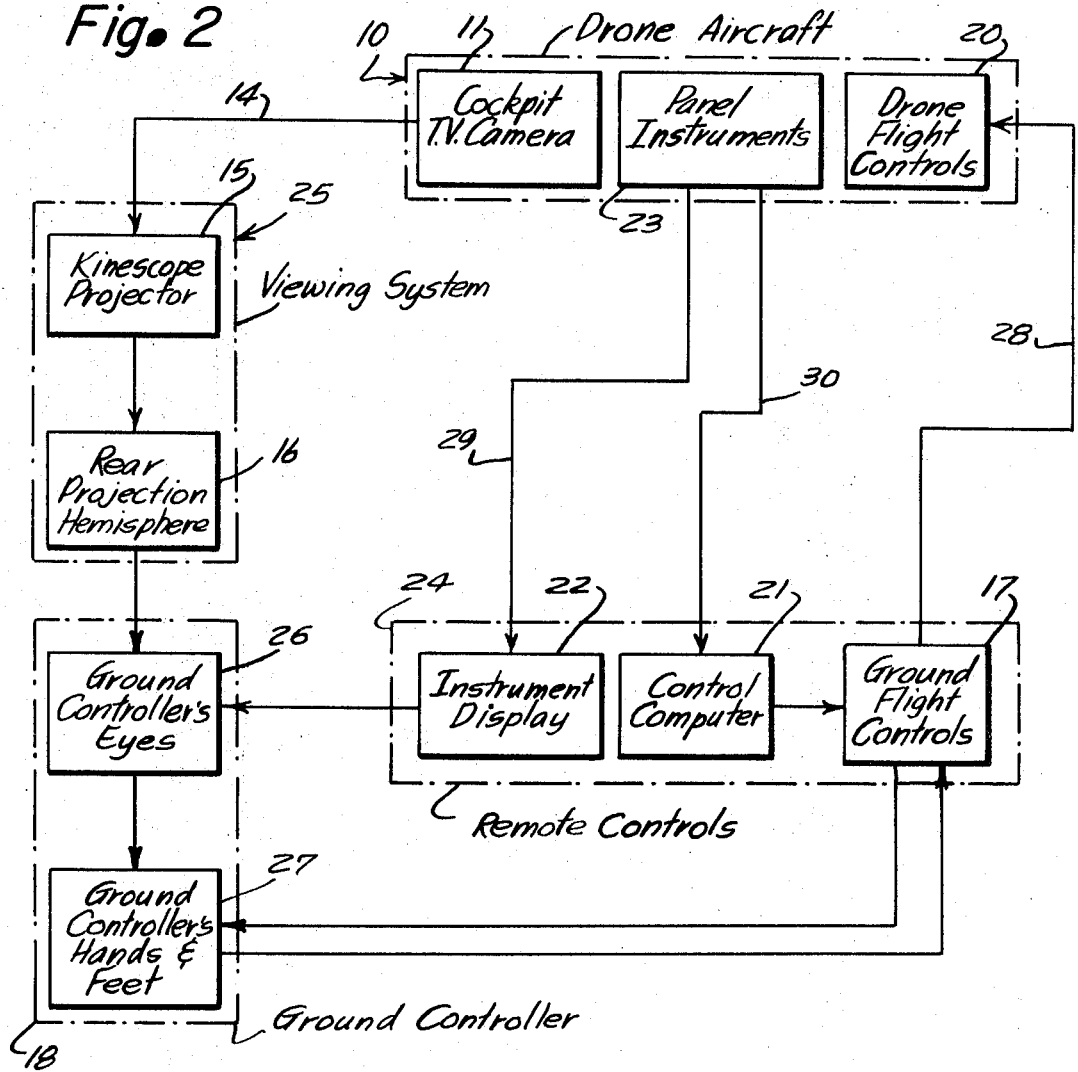
FIG. 2 is a block diagram of the system.

Referring to FIGS. 1 and 2 of the drawing, there is shown a television camera 11 held in place by support 13 and mounted in the cockpit seat 35 of the drone aircraft 10. The television camera 11 is equipped with an ultrawide-angle lens having a 180° field of view. The television camera 11 transmits a signal 14 which is received by television projector 15 and projected onto the convex surface of transluscent hemisphere 16. The television projector 15 may be a kinescope projector, or a control layer system such as the Eidophor System manufactured by Gretag, Limited of The Netherlands. Hemisphere 16 may be constructed of glass, plexiglass or the like with a prepared surface to permit rear projection viewing from the concave side.

To operate the system, the ground controller 18 places himself in front of the remote control console 24 such that the ground controller's eyes 26 are placed at approximately the center of curvature of the hemisphere 16. The ground controller 18 then activates television camera 11 which transmits pictures to the television projector 15, which projects onto the convex surface of hemisphere 16 for display on the concave surface of hemisphere 16. The ground controller now has a view which is not dissimilar to that which he would have if he were in the cockpit of the drone aircraft 10.

Using his ground flight controls 17 the ground controller 18 operates the drone flight control 20 via telemetry link 28. The ground controller is now able to cause the drone aircraft 10 to begin flight. Once in flight the drone panel instruments 23 have their readings transmitted via telemetry link 29 to the instrument display 22 which is readily visible to ground controller 18. When the ground controller 18 observes an object 19 approaching his aircraft 10, using ground flight controls 17 he can cause the drone aircraft 10 to avoid the object. If he wishes, the ground controller can cause the drone to fly using the control computer 21, which is operatively connected to the drone aircraft 10 via telemetry link 30.

If the drone 10 is to be crashed, the cockpit seat 35 may be ejected and the television camera 11 and wide-angle lens 12 recovered.

Thus the system permits drone aircraft to be flown entirely from the ground without necessitating the use of chase planes as had been done previously.

Figure 3:
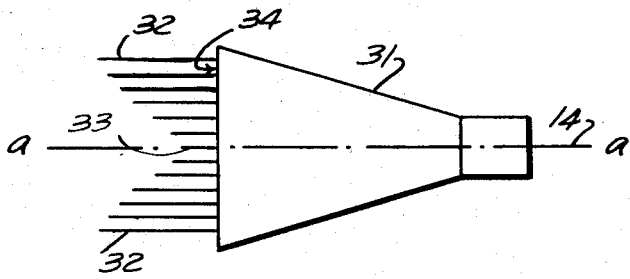
FIG. 3 is a closeup view of a kinescope equipped with fiber optics.

An alternate embodiment as shown in FIG. 3 discloses a conventional kinescope 31 receiving signal 14 from the cockpit television camera. A plurality of optical fibers are connected to the face 34 of the kinescope 31. The outermost fibers 32 are of a length such that when viewed along axis a–a the fibers 32 describe the perimeter of a hemisphere. The innermost fiber 33, is of a length which is shorter than fibers 32 by an amount equal to one-half the diameter of the kinescope. The sectional view, FIG. 3, shows a half circle described by the optical fibers; and the optical fibers are arranged to form a concavity which is a hemisphere.

In a third embodiment, the panel instruments 23 may be included in the picture transmitted via television signal 14. This is accomplished by adjusting the television camera 11 to includes the panel instruments 23 in its field of view.

The fourth embodiment uses a flat-faced kinescope. However, this method has the disadvantages of barrel distortion.

In another embodiment, said television camera 11 equipped with wide-angle lens 12 may be mounted outside the cockpit of the drone aircraft 10. For example, this embodiment may be employed when the drone aircraft 10 is not equipped with a cockpit.

Various other modifications are contemplated and may obviously be resorted to by those skilled in the art without departing from the spirit and scope of the invention, as hereinafter defined by the appended claims.

GOVERNMENT INTEREST

The invention described herein may be manufactured and used by or for the Government of the United States of America for governmental purposes without the payment of any royalties thereon or therefor.

We claim:

1. A system for flying drone aircraft from the ground entirely by remote control comprising:
   a drone aircraft having a conventional aircraft cockpit including an instrument panel, ejection seat, and flight controls;
   a remote control station;
   a television camera, having a 180° lens, detachably mounted on said ejection seat of said aircraft at the position a pilot's head would be if a pilot were occupying said ejection seat, and scanning the view said pilot would see;

telemetry means for transmitting signals from said television camera to said station;

telemetry means for transmitting the readings of said cockpit instruments to said station;

a kinescope projector and translucent hemispheric viewing screen at said station for receiving said transmitted television camera signals, and producing and displaying an undistorted picture of said view scanned by said television camera wherein said kinescope projector projects said view onto the convex surface of said hemisphere and said picture is displayed for viewing on the concave surface of said hemisphere;

means for receiving said telemetered instrument readings at said station and displaying said readings on an instrument panel identical to the instrument panel in said drone;

a simulated cockpit at said station having said remote control station instrument panel, and flight controls identical to those in said drone such that a pilot seated before said instrument panel and said flight controls with his head at the center of curvature of said hemisphere can see the view he would see if he were occupying said drone's ejection seat;

means for moving the flight controls in said drone in response to the movement of said flight controls by said pilot at said station such that the flight of said drone is controlled entirely by remote control; and means for ejecting said camera and said seat from said aircraft, including a parachute, such that said camera can be ejected and recovered.